United States Patent
Raudsepp

(10) Patent No.: US 10,201,872 B2
(45) Date of Patent: Feb. 12, 2019

(54) CONTACT TIP FOR USE IN GAS METAL-ARC WELDING

(75) Inventor: Hannes Raudsepp, Solna (SE)

(73) Assignee: ESAB AB, Gothenburg (SE)

( * ) Notice: Subject to any disclaimer, the term of this patent is extended or adjusted under 35 U.S.C. 154(b) by 338 days.

(21) Appl. No.: 14/366,788

(22) PCT Filed: Dec. 20, 2011

(86) PCT No.: PCT/SE2011/051549
§ 371 (c)(1),
(2), (4) Date: Sep. 5, 2014

(87) PCT Pub. No.: WO2013/095221
PCT Pub. Date: Jun. 27, 2013

(65) Prior Publication Data
US 2015/0014282 A1    Jan. 15, 2015

(51) Int. Cl.
*B23K 9/28* (2006.01)
*B23K 9/12* (2006.01)
(Continued)

(52) U.S. Cl.
CPC ............ *B23K 9/28* (2013.01); *B23K 9/123* (2013.01); *B23K 9/173* (2013.01); *B23K 9/26* (2013.01); *B23H 7/107* (2013.01)

(58) Field of Classification Search
CPC .......... B23K 9/123; B23K 9/295; H05H 1/34; B23H 7/107
(Continued)

(56) References Cited

U.S. PATENT DOCUMENTS 2,909,645 A    4/1995   Berg
6,559,416 B1   5/2003   Steenis et al.
(Continued)

FOREIGN PATENT DOCUMENTS

CN    1392020 A      1/2003
CN    201537765 U    8/2010
(Continued)

OTHER PUBLICATIONS

Copper Development, Association, Inc., Copper-Nickel Alloys: Properties, Processing, Applications, Mar. 7, 2018, p. 7.*
(Continued)

*Primary Examiner* — Steven J Ganey
*Assistant Examiner* — Christopher R Dandridge
(74) *Attorney, Agent, or Firm* — Edell, Shapiro & Finnan, LLC

(57) ABSTRACT

A contact tip (1) for gas metal-arc welding comprising:
A body (3) of a metal material with a tubular base portion (4) and two or more fingers (5a, 5b) extending in the axial direction from a front end of the base portion;
At least one wire-feed conduit (7) extending axially through the body, in which a welding wire is to be received and fed;
slots (10a, 10b) arranged between the fingers in order to space these apart, and
A spring means (11) surrounding the fingers and exerting a radially acting spring force on the fingers of such strength that the fingers, when cool, are kept spaced apart, such that no pressure will be exerted on the casing surface of a welding wire introduced in the wire-feed conduit, and when heated to a temperature above the softening temperature of the metal material, are compressed by the spring force radially inward in
(Continued)

order to exert pressure on the casing surface of a welding wire received in the wire-feed conduit.

19 Claims, 2 Drawing Sheets

(51) Int. Cl.
  *B23K 9/173* (2006.01)
  *B23K 9/26* (2006.01)
  *B23H 7/10* (2006.01)
(58) Field of Classification Search
  USPC .............. 219/137.61, 121.5, 121.48, 137.31, 219/137.32
  See application file for complete search history.

(56) References Cited

U.S. PATENT DOCUMENTS

| | | | | |
|---|---|---|---|---|
| 8,383,987 B2 * | 2/2013 | Ma | ........................ | B23K 9/123 219/137.44 |
| 2003/0019857 A1 * | 1/2003 | Takagi | .................. | B23K 9/173 219/137.61 |
| 2004/0211177 A1 * | 10/2004 | Kutlucinar | .............. | F03G 7/065 60/527 |
| 2006/0046799 A1 | 3/2006 | Brune | | |

FOREIGN PATENT DOCUMENTS

| | | | |
|---|---|---|---|
| CN | 201799759 U | 4/2011 | |
| EP | 1266714 A1 | 12/2002 | |
| FR | 2480650 A1 | 10/1981 | |
| JP | S56-160883 A | 12/1981 | |
| JP | S59-180860 U | 12/1984 | |
| JP | S62-6985 U | 1/1987 | |
| JP | S63-47073 U | 3/1988 | |
| JP | H07-100653 A | 4/1995 | |
| JP | H07100653 * | 4/1995 | ............... B23K 9/26 |
| JP | H07100653 A | 4/1995 | |
| JP | H10-193123 A | 7/1998 | |
| JP | 2002-261210 A | 9/2002 | |
| JP | 2011-073032 A | 4/2011 | |
| JP | 2011-235343 A | 11/2011 | |
| JP | 2011235343 A | 11/2011 | |
| RU | 2396154 C1 | 8/2010 | |
| SU | 288188 A1 | 12/1970 | |
| SU | 880650 A1 | 11/1981 | |
| WO | 96/26034 A | 8/1996 | |
| WO | 03055633 A1 | 7/2003 | |
| WO | WO2006046799 * | 5/2006 | ............... B23K 9/26 |

OTHER PUBLICATIONS

Pelton, A.R., Nitinol Fatigue: A Review of Microstructures and Mechanisms, Jan. 28, 2011, p. 1.*
Supplementary European Search Report dated Mar. 3, 2016 for European Patent Application No. 11878327.
Office Action and translation for Korean Patent Application 10-2014-7020183 dated Jan. 11, 2018.
Office Action and translation for Japanese Patent Application 2017-006868 dated Nov. 28, 2017.
Notice of Reason for Rejection for JP Patent Application No. 2017-006868 dated Apr. 3, 2018, with translations.
Office Action and translation for Brazilian Patent Application BR112014015316-7 dated Jun. 6, 2018.

* cited by examiner

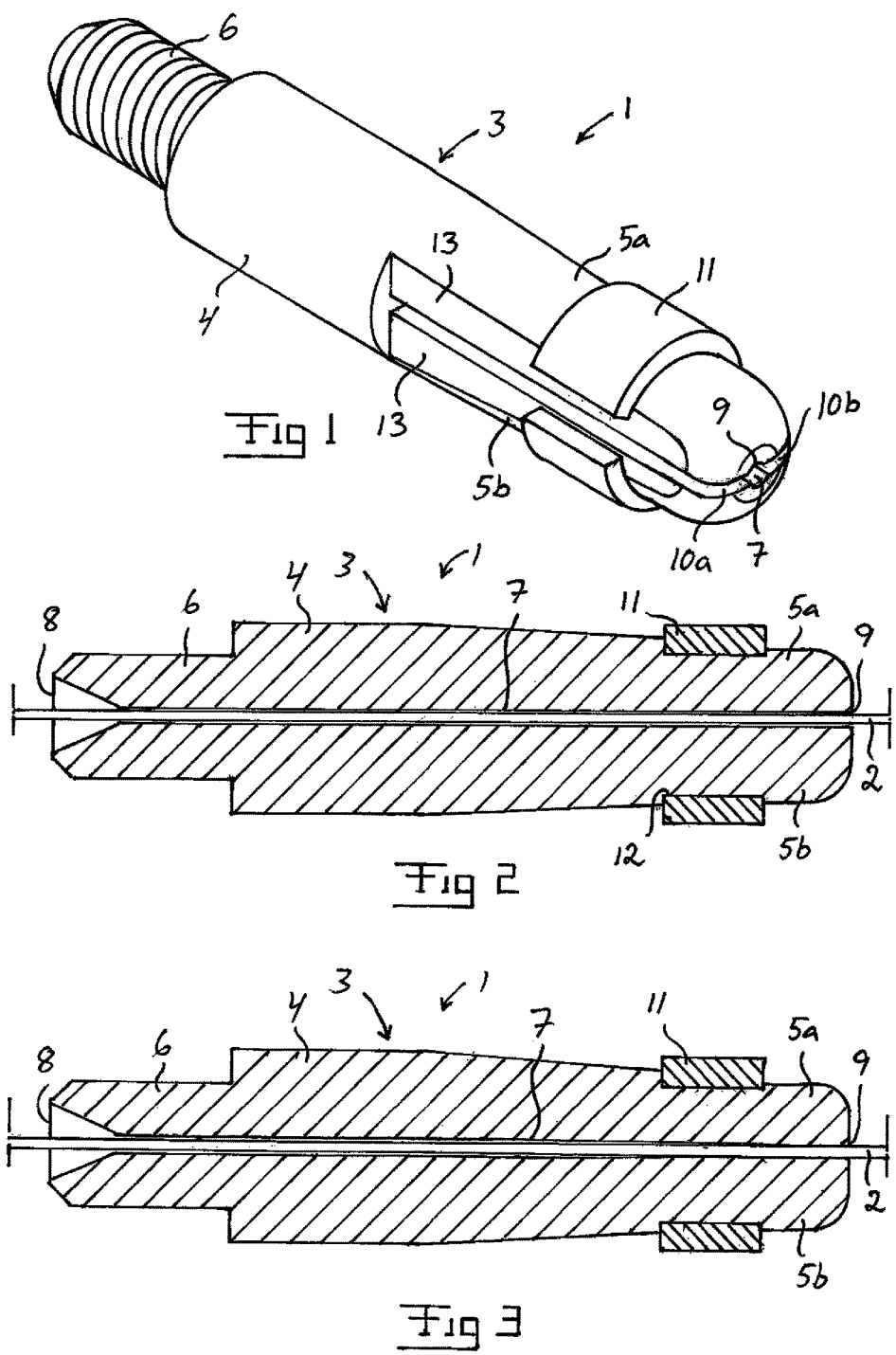

CONTACT TIP FOR USE IN GAS METAL-ARC WELDING

CROSS-REFERENCE TO RELATED APPLICATION

This application is a U.S. national stage application of PCT Application No. PCT/SE2011/051549 filed 20 Dec. 2011, by Hannes Raudsepp, titled "CONTACT TIP FOR USE IN GAS METAL-ARC WELDING," which is incorporated herein by reference in its entirety.

FIELD OF THE INVENTION AND PRIOR ART

The present invention relates to a contact tip according to the preamble of Claim 1 for use in gas metal-arc welding.

With gas metal-arc welding, a welding wire is fed through a wire-feed conduit within a contact tip. The contact tip is of a metallic material with good electrical conductivity and forms a contact means for transferring the welding current to the welding wire being fed through the contact tip. Gas metal-arc welding can be done with a welding wire in the form of either a solid wire or a powder-filled cored wire. In gas metal-arc welding, an arc is maintained between the welding wire and the workpiece being welded. MAG welding and MIG welding represent two common types of gas metal-arc welding. In MAG welding, the arc and weld pool is protected by a flow of an active shielding gas, and in MIG welding, the arc and the weld pool are protected by a flow of inert shielding gas In gas metal-arc, welding with a welding wire in the form of a powder-filled cored wire, welding can also be done without the addition of an inert gas.

When passing through the wire-feed conduit within the contact tip, the welding wire slides toward the inner surface of the wire-feed conduit, thereby achieving the desired contact for transmitting the power from the contact tip to the welding wire. In a conventional contact tip, the wire-feed conduit receives the welding wire with a small clearance, and the position of the contact point between the welding wire and the contact tip may vary during the welding process, which, for instance, may give rise to undesired and unfavorable arcs between the welding wire and the contact tip inside the wire-feed conduit. Such sporadic arcing can cause great power losses causing subsequent heating and tip wear. Moreover, arcing may cause the welding wire to burn into the tip, requiring it to be discarded. Moreover, a variable position of the point of contact between the welding wire and the contact tip causes the length of the welding wire, which is traversed by the welding current, to vary, which in turn causes the characteristics of the arc between the welding wire and the workpiece to vary and reduces the weld quality. The above-mentioned problems may be averted by maintaining a continuous and favorable electrical contact between the welding wire and the contact tip in the area adjacent to the outlet port of the wire-feed conduit. However, the ability to maintain such contact is complicated by the subjection of the inner surface of the wire-feed conduit to mechanical abrasion of the welding wire, which may cause increased play between the welding wire and the inner surface of the wire-feed conduit, thereby impairing the electrical contact between the welding wire and the inner surface of the wire-feed conduit. The wear of the wire-feed conduit inner surface also leads to reducing the control over the welding wire at the outlet end of the wire-feed conduit, which causes welding precision to deteriorate. The mechanical abrasion and the wear of the contact tip as a result of sporadic arcing inside the wire-feed conduit reduces the life of the contact tip. It is desirable to increase the life of the contact tips in order to limit the material costs and downtime associated with replacing worn contact tips with new ones.

A variety of solutions have been proposed over the years to ensure a continuous and favorable electrical contact between a welding wire and a contact tip in the area adjacent to the outlet port of the contact tip wire-feed conduit. Examples of such solutions are disclosed, e.g., in U.S. Pat. Nos. 6,559,416 B1, 6,710,300 B2, US 2011/0036821 A1 and WO 2006/046799 A1. However, only a few of the solutions proposed and developed thus far have achieved commercial success, and the above-mentioned problem remains in need of a simple and efficient solution.

OBJECT OF THE INVENTION

The object of the present invention is to provide a simple and efficient contact tip with a favorable service life, in which a continuous and favorable electrical contact may be ensured between a welding wire and the contact tip in the area adjacent to the outlet port of the contact tip wire-feed conduit under normal welding conditions.

SUMMARY OF THE INVENTION

The said object is achieved according to the present invention by a contact tip having the characteristics defined in Claim 1.

The contact tip according to the, invention comprises:

A body of an electrically conductive metal material, which body has a tubular base portion and two or more fingers connected with the base portion and extending in axial direction from a front end of the base portion;

At least one wire-feed conduit extending axially through the body, into which conduit, a welding wire is adapted to be received and fed, the said wire-feed conduit having an inlet port at the rear end of the contact tip and an outlet port at the front end of the contact tip between said fingers;

Slots provided in the body between the said fingers in order to space these apart, whereby each slot extends in axial direction from the body's base portion up to the said outlet port; and A spring means surrounding the said fingers and adapted to exert a radially acting spring force on the fingers of such strength that the fingers, when cool, are kept spaced apart, such that they will not exert pressure on the casing surface of a welding wire received in the wire-feed conduit, and when heated to a temperature above the softening temperature of the metal material, pressed by the spring force radially inward in order to exert pressure on the casing surface of a welding wire received in the wire-feed conduit.

With the solution according to the invention, the contact tip fingers are pressed against a welding wire received in the wire-feed conduit only upon heating the contact tip to a temperature above the softening temperature of the metal material. This heating of the contact tip occurs automatically after initiation of welding due to the action of the heat generated during welding. During the welding process, when the temperature of the contact tip exceeds the softening temperature of the metal material, the contact-tip fingers are resilient, such that they can be pressed into abutment against the welding wire advancing through the wire-feed conduit by the spring means. This makes it possible, during the welding process, to ensure continuous and favorable electrical contact between the welding wire and the contact tip in the area adjacent to the outlet port of the contact-tip wire-feed conduit. As the inner surface of the wire-feed conduit is abraded during welding, due to the action of the welding wire, the spring means gradually presses the fingers closer together to one another, while maintaining a continuous and favorable electrical contact between the welding wire and the contact tip in the area adjacent to the outlet port of the wire-feed conduit, which contributes to a favorable service life of the contact tip When the contact tip is cool, the contact tip fingers are sufficiently rigid to resist the radially acting spring force of the spring means, whereby the fingers then can be kept spaced apart at a desirable distance, such that, prior to welding, a welding wire easily can be inserted into and advanced without resistance from the fingers through the wire-feed conduit. Moreover, the contact tip according to the invention has a simple design with few separate parts and is relatively simple and inexpensive to manufacture.

The spring means may be of a temperature-resistant metallic spring material exerting a radially acting spring force on the contact-tip fingers of a substantially constant strength independent of the temperature, provided that the softening, temperature of the spring material is not exceeded, or a bimetallic element, which may be adapted to exert a radially acting spring force on the contact tip fingers that has a negligible value or a zero value, at low temperatures, and whose value increases with increasing temperature. In either event, the spring means should obviously be made of a spring material with a softening temperature exceeding the softening temperature of the metal material in the contact-tip body and furthermore, above the temperature normally obtained in the contact tip during welding.

Other advantageous features of the contact tip according to the invention appear from the dependent claims and the following description.

BRIEF DESCRIPTION OF THE DRAWINGS

The invention will be described in more detail below by means of embodiments and with reference to the accompanying drawings. The following is displayed:

FIG. 1 a schematic perspective view of a contact tip according to an embodiment of the present invention;

FIG. 2 A cross-section through the contact tip according to FIG. 1 in a cool state;

FIG. 3 A cross-section through the contact tip according to FIG. 1 in a heated state;

DETAILED DESCRIPTION OF THE EMBODIMENTS OF THE INVENTION

Figure 4:
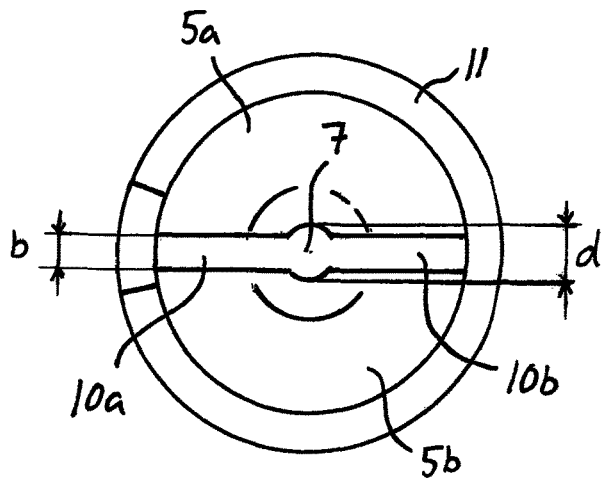
FIG. 4 A front view of the contact tip according to FIG. 1.

FIGS. 1-4 show a contact tip 1 according to an embodiment of the present invention for use in gas metal-arc welding with a welding wire 2 in the form of a solid or cored wire. Contact tip 1 comprises a body 3 made of electrically conductive metal material, preferably in the form of a copper alloy for high temperature applications. Body 3 has a tubular base portion 4 and fingers 5a, 5b connected with the base portion 4 and extending in axial direction from a front end of the base portion. Body 3 is furthermore provided with a thread 6 arranged at the rear end of base portion 4. This thread 6 allows contact piece 1 to be screwed tightly into a welding apparatus. Base portion 4 and fingers 5a, 5b are integrated in one piece.

A straight wire-feed conduit 7 extends axially through the body 3 along the body's center axis. This wire-feed conduit 7 contains a welding wire 2 adapted to be received and advanced. Wire-feed conduit 7 has an inlet port 8 at the rear end of the contact tip and an outlet port 9 at the front end of the contact tip between fingers 5a, 5b. Wire-feed conduit 7 is implemented with a slightly greater diameter d, e.g., 0.1-0.2 mm or so greater than the diameter of welding wire 2, which is adapted to be received in the wire-feed conduit, such that this welding wire 2 may be received with a small clearance in wire-feed conduit 7.

Slots 10a, 10b are arranged in the body 3 between fingers 5a, 5b in order to separate them from one another, whereby each slot 10a, 10b extends in axial direction from the body base portion 4 up to the outlet port of wire-feed conduit 9. Each slot 10a, 10b extends in radial direction between wire-feed conduit 7 and an outer surface of body 3. The front part of body 3 is thus divided by slots 10a, 10b, such as to form the said fingers 5a, 5b. The axial length of each slot 10a, 10b preferably corresponds to 25-80% or so of the total tip length.

The abrasion margin of the wire-feed conduit inner surface increases with increasing width of the slots 10a, 10b, However, the width of the slots may not be so great that the welding wire 2, when advanced between fingers 5a, 5b, will be liable to slide laterally out of the wire-feed conduit 7 and into the slots 10a, 10b. Each slot 10a, 10b preferably has a width w that corresponds to 25-90% or so of the wire-feed conduit diameter d.

In the illustrated example, fingers 5a, 5b are two in number and separated from one another by two slots 10a, 10b opposingly arranged on opposite sides of the wire-feed conduit 7. Alternatively, the number of fingers 5a, 5b could be greater than two, e.g., three or four, which obviously will increase the number of slots 10a, 10b accordingly.

Contact tip 1 is provided with a spring means 11, which surrounds the fingers 5a, 5b. Spring means 11 is arranged around fingers 5a, 5b at the front portion of the fingers and is received in a groove 12 arranged on the outside of fingers 5a, 5b. Spring means 11 preferably comprises a conventional spring, but could alternatively consist of a bimetallic element, e.g., a bimetallic element in the shape of an open ring. In the illustrated example, the spring means 11 consists of a volute spring in the shape of an open ring, however, it could alternatively consist of a coil spring.

Spring means 11 is arranged in order to exert a radially acting spring force on fingers 5a, 5b with such strength that the fingers, when cool, and, e.g., at room temperature or some other temperature substantially below the softening temperature of the body's metal material, are maintained at such a distance from one another that they do not exert pressure against the casing surface of a welding wire 2 received in wire-feed conduit 7, as illustrated in FIG. 2, whereby fingers 5a, 5b, when heated to a temperature above the softening temperature of the body's metal material, are compressed radially inward by the spring force of the spring means in order to exert pressure against the casing surface of welding wire 2 received by the wire-feed conduit 7, as illustrated in FIG. 3. When the contact tip 1 is cool and at a temperature below the softening temperature of the actual metal material, fingers 5a, 5b will thus not be compressed by spring means 11 toward a welding wire 2 fed through the wire-feed conduit 7 up to the outlet port 9 of the wire-feed conduit. Consequently, fingers 5a, 5b will not complicate the introduction of a welding wire 2 into contact tip 1 in connection with preparing a welding apparatus provided with the contact tip in order to perform welding. When subsequently beginning to weld and heating the contact tip 1 to a temperature above the softening temperature of said metal material, the spring means 11 will compress fingers 5a, 5b toward one another and into abutment against welding wire 2 introduced in wire-feed conduit 7, thus ensuring a continuous and favorable electrical contact between fingers 5a, 5b, and welding wire 2 in the area adjacent to the outlet port 9 of the wire-feed conduit.

Figure 5:
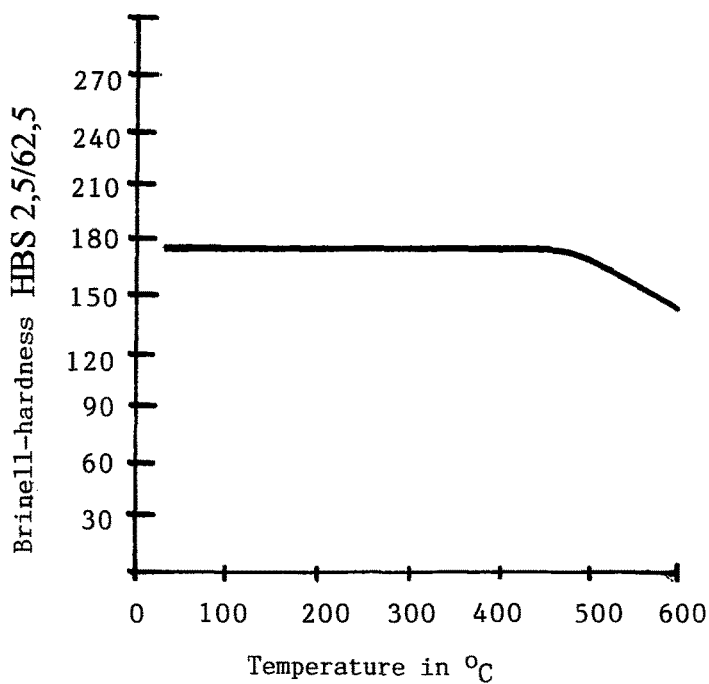
FIG. 5 A diagram showing the nominal hardness of a metallic material varying with the temperature of the metal material.

The softening temperature of the metal material is the temperature at which the hardness of the material begins to decrease with increasing temperature. Until the material reaches a temperature matching the material's softening temperature, the material has a substantially constant hardness, but after heating to the softening temperature, the material's hardness will decrease with increasing temperature. FIG. 5 provides a diagram showing the nominal hardness as a function of the temperature of a copper alloy with a softening temperature of 475° C. As shown in the diagram according to FIG. 5, the hardness of this material is situated at a substantially constant value up to a temperature of 475° C. and then decreases with increasing temperature.

Spring means 11 is made of a metallic spring material with a softening temperature situated above the softening temperature of the metallic material from which the contact tip body 3 is made and which furthermore is situated above the temperature normally reached in tip 1, when performing welding. In order to work properly under normal welding conditions, the spring material should have a softening temperature of 1500° C. or above.

Fingers 5a, 5b in contact tip 1 illustrated in FIGS. 1-4 are provided with recesses 13, which are adapted to form engagement surfaces for a tool used to fasten the contact tip at a welding apparatus and to unscrew the contact tip from the welding apparatus.

In the illustrated example, contact tip 1 is provided with a single wire-feed conduit 7. However, a contact tip according to the present invention could alternatively be provided with two or more wire-feed conduits extending parallel to one another through the base portion 4 and fingers 5a, 5b of the contact tip body 3, whereby these wire-feed conduits are adapted to receive a wire each.

Naturally, the invention is in no way limited to the embodiments described above, instead many modification options will be obvious to someone skilled in the relevant art, without departing per se from the basic concept of the invention, as defined by the attached claims.

The invention claimed is:

1. A contact tip for use in gas metal-arc welding, the contact tip comprising:
   a body comprising an electrically conductive first metallic material, wherein the body has a tubular base portion and two or more fingers connected to the base portion and extending in an axial direction from a front end of the base portion, wherein at least one of the fingers includes a planar side surface, the planar side surface extending in the axial direction;
   at least one wire-feed conduit extending axially through the body in which a welding wire is to be received and advanced, the wire-feed conduit having an inlet opening at a rear end of the contact tip and an outlet port at a front end of the contact tip between the fingers, and slots arranged in the body between the fingers in order to separate the fingers from one another, whereby each slot extends in the axial direction from the body's base portion and to the outlet port;
   wherein the contact tip includes a spring surrounding the fingers, wherein the spring includes a second metallic material having a softening temperature above a softening temperature of the first metallic material and is arranged to exert a radially inward spring force on the fingers, wherein the fingers at a temperature substantially below the softening temperature of the first metallic material of the body are spaced apart such that a casing surface of a welding wire is adjustable in the wire-feed conduit, and wherein the fingers at a temperature above the softening temperature of the first metallic material of the body during operation are compressed by the radially inward spring force to exert pressure against the casing surface of the welding wire introduced in the wire-feed conduit, and wherein the spring has an opening in a circumferential direction of the spring, the opening being disposed at the planar side surface of the at least one of the fingers.

2. The contact tip according to claim 1, wherein the spring is disposed in a groove disposed on the outside of the fingers.

3. The contact tip according to claim 2, wherein the spring is a volute spring in the shape of an open ring.

4. The contact tip according to claim 1, wherein the spring is a bimetallic element.

5. The contact tip according to claim 1, wherein the softening temperature of the second metallic material of the spring is at least two times above the softening temperature of the first metallic material from which the contact tip body is made.

6. The contact tip according to claim 1, wherein the spring is arranged around the fingers at a front portion thereof.

7. The contact tip according to claim 1, wherein the fingers are two in number and spaced apart by two slots opposingly arranged on opposite sides of the wire-feed conduit.

8. The contact tip according to claim 1, wherein the slot has a width (w) corresponding to 25-90% of the diameter (d) of the wire-feed conduit.

9. The contact tip according to claim 1, wherein the body is made of a copper alloy.

10. A contact tip for use in gas metal-arc welding, the contact tip comprising:
   a body comprising a metallic material, wherein the body has a tubular base portion and two or more fingers connected to the base portion and extending in an axial direction from a front end of the base portion, wherein at least one of the fingers includes a recess cutting into a tubular surface of the fingers to form a planar surface, the planar surface extending in the axial direction;
   at least one wire-feed conduit extending axially through the body in which a welding wire is to be received and advanced, the wire-feed conduit having an inlet opening at a rear end of the contact tip and an outlet port at a front end of the contact tip between the fingers;
   slots arranged in the body between the fingers in order to separate the fingers from one another, whereby each slot extends in the axial direction from the body's base portion and to the outlet port; and
   a spring surrounding the fingers and arranged to exert a radially inward spring force on the fingers, wherein the fingers at a temperature substantially below a softening temperature of the metallic material of the body are spaced apart such that a casing surface of a welding wire is adjustable in the wire-feed conduit, and wherein the fingers at a temperature above the softening temperature of the metallic material of the body during operation are compressed by the radially inward spring force to exert pressure against the casing surface of the welding wire introduced in the wire-feed conduit, wherein the spring includes an opening in a circumferential direction of the spring, the opening being disposed at the planar surface of the at least one of the fingers.

11. The contact tip according to claim 10, wherein the spring is disposed in a groove disposed on the outside of the fingers.

12. The contact tip according to claim 10, wherein the spring is a volute spring in the shape of an open ring.

13. The contact tip according to claim 10, wherein the metallic material of the body is a first metallic material, and the spring includes a second metallic material with a softening temperature above the softening temperature of the first metallic material of the contact tip body.

14. The contact tip according to claim 13, wherein the softening temperature of the second metallic material of the spring is at least two times above the softening temperature of the first metallic material of the contact tip body.

15. The contact tip according to claim 10, wherein the spring is a bimetallic element.

16. The contact tip according to claim 10, wherein the spring is arranged around the fingers at a front portion thereof.

17. The contact tip according to claim 10, wherein the fingers are two in number and spaced apart by two slots opposingly arranged on opposite sides of the wire-feed conduit.

18. The contact tip according to claim 10, wherein the slot has a width (w) corresponding to 25-90% of the diameter (d) of the wire-feed conduit.

19. The contact tip according to claim 10, wherein the body is made of a copper alloy.

* * * * *